United States Patent
Sherman et al.

(10) Patent No.: US 12,500,792 B2
(45) Date of Patent: Dec. 16, 2025

(54) SYSTEM FOR CELLULAR AND SATELLITE BROADBAND SERVICES

(71) Applicant: Powermat Technologies Ltd., Petach Tikva (IL)

(72) Inventors: Itay Sherman, Hod Hasharon (IL); Elieser Mach, Rosh Tsurim (IL); Neri Naveh, Kiryat Ono (IL)

(73) Assignee: Powermat Technologies Ltd., Petach Tikva (IL)

( * ) Notice: Subject to any disclaimer, the term of this patent is extended or adjusted under 35 U.S.C. 154(b) by 549 days.

(21) Appl. No.: 17/885,710

(22) Filed: Aug. 11, 2022

(65) Prior Publication Data
US 2023/0050964 A1 Feb. 16, 2023

Related U.S. Application Data

(60) Provisional application No. 63/232,240, filed on Aug. 12, 2021.

(51) Int. Cl.
*H04L 12/28* (2006.01)
*H04B 3/54* (2006.01)

(52) U.S. Cl.
CPC ........... *H04L 12/2898* (2013.01); *H04B 3/54* (2013.01); *H04B 2203/5445* (2013.01)

(58) Field of Classification Search
CPC .............. H04L 12/2898; H04B 3/54; H04B 2203/5445; H02J 50/005; H02J 50/80
See application file for complete search history.

(56) References Cited

U.S. PATENT DOCUMENTS

| | | | |
|---|---|---|---|
| 10,735,838 B2 * | 8/2020 | Cumana Morales | ... H04L 12/46 |
| 11,272,861 B1 * | 3/2022 | Filipovic | ............... A61B 5/1117 |
| 2013/0285606 A1 * | 10/2013 | Ben-Shalom | ............ H04B 5/79 320/108 |
| 2015/0063428 A1 | 3/2015 | Lever | |
| 2017/0141604 A1 * | 5/2017 | Park | ...................... B60L 53/126 |
| 2018/0145844 A1 * | 5/2018 | Pera | .................... H04L 12/2803 |
| 2018/0262272 A1 * | 9/2018 | Ashrafi | ............. H04L 25/03343 |
| 2020/0091778 A1 | 3/2020 | Liao et al. | |
| 2020/0204212 A1 * | 6/2020 | Fawcett | ............... H04B 10/116 |
| 2022/0085666 A1 | 3/2022 | Chamberlain | |

FOREIGN PATENT DOCUMENTS

WO 2011019088 A2 2/2011

OTHER PUBLICATIONS

Extended European Search Report for Application No. 22190121.8-1202 / 4135158 dated Feb. 2, 2023.
Communication pursuant to Article 94(3) EPC received in EP Appliaction No. 22190121.8, dated Aug. 30, 2023, 4 pages.

* cited by examiner

*Primary Examiner* — Tejis Daya
(74) *Attorney, Agent, or Firm* — Volpe Koenig

(57) ABSTRACT

A user premises system is provided. The user premises system includes an internal unit and an external modem unit. The internal unit includes a wireless power transmitter unit that inductively provides power through an exterior structure of a premises. The external modem unit includes a wireless power receiver unit that inductively receives power from the wireless power transmitter unit of the internal unit through the exterior structure of the premises. The internal and the external modem units each include a short range transceiver that wireless communicate data between internal and the external modem units.

19 Claims, 4 Drawing Sheets

SYSTEM FOR CELLULAR AND SATELLITE BROADBAND SERVICES

CROSS REFERENCE TO RELATED APPLICATIONS

This application claims priority from U.S. Provisional Patent Application No. 63/232,240, entitled "SYSTEM FOR CELLULAR AND SATELLITE BROADBAND SERVICES," filed on Aug. 12, 2021, which is hereby incorporated by reference as if set forth in full in this application for all purposes.

BACKGROUND

In general, presently deployed broadband access systems can include satellite, cellular, or millimeter wave (MMW) point-to-point (P2P) services. Infrastructure segments of these broadband access systems can respectively include cellular headend equipment and cellular towers for cellular, multiple orbital satellite, and MMW P2P links. Further, user premises segments of these broadband access systems includes transmit/receive (TX/RX) antenna, a modem, and a router that distributes broadband services through a user premises using either local area network (LAN) technologies, such as WiFi or Ethernet.

One or more technical problems with presently deployed broadband access systems include location concerns of the equipment of user premises segments. For instance, the TX/RX antenna is generally required to be located outside of the user premises (e.g., a house), while the router is located within the user premises. Note that, in many cases, a route therebetween is not proximate to exterior walls of the user premises. Regardless of location, the equipment of user premises segments require power. And, where power is generally readily available inside the user premises, it is further more often the case that power is not available outside of the user premises. Additionally, presently deployed broadband access systems fail to account for any installations of metallic elements that could interfere with normal operation of elements therein.

Thus, there is a need for an efficient system for cellular and satellite broadband services.

SUMMARY

According to one or more embodiments, a user premises system is provided. The user premises system includes an internal unit and an external modem unit. The internal unit includes a wireless power transmitter unit that inductively provides power through an exterior structure of a premises. The external modem unit includes a wireless power receiver unit that inductively receives power from the wireless power transmitter unit of the internal unit through the exterior structure of the premises. The internal and the external modem units each include a short range transceiver that wireless communicate data between internal and the external modem units. According to one or more embodiments, the above user premises system can be implemented as a method, an apparatus, system, and/or a computer program product.

According to one or more embodiments, a method is provided. The method is implemented by a user premises system comprising an internal unit and an external modem unit position on opposite sides of an exterior structure of a premises. The method includes detecting, by the internal unit, foreign objects that would interfere with data and power transfers within the exterior structure of the premises. The method includes inductively providing power, by a wireless power transmitter unit of the internal until, through the exterior structure of the premises to the internal unit comprising. The method includes inductively receiving power, by a wireless power receiver unit of the external modem unit, from the wireless power transmitter unit of the internal unit.

According to one or more embodiments, the above method can be implemented as a user premises system, an apparatus, system, and/or a computer program product.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages of the embodiments herein are apparent from the following detailed description taken in conjunction with the accompanying drawings in which:

DETAILED DESCRIPTION

Embodiments disclosed herein may include apparatuses, systems, methods, and/or computer program products for an efficient system for cellular and satellite broadband services (e.g., a system). According to one or more embodiments, the efficient system described herein provides broadband access based on satellite, cellular or mmWave P2P services. For instance, an infrastructure segment of the efficient system includes cellular headend and towers for cellular links and multiple satellites in orbit for satellite services or P2P mmWave links. Further, Because the efficient system is aware of the conventional location concerns of user premises equipment of presently deployed broadband access systems (e.g., among other concerns described herein, an antenna needs to be located outside of the user premises, while the router needs to reside within the premises and not in proximity to an exterior wall of the user premises), the efficient system defines a system structure to solve the conventional location concerns and allow for simple user installation of the user premises.

Figure 1:
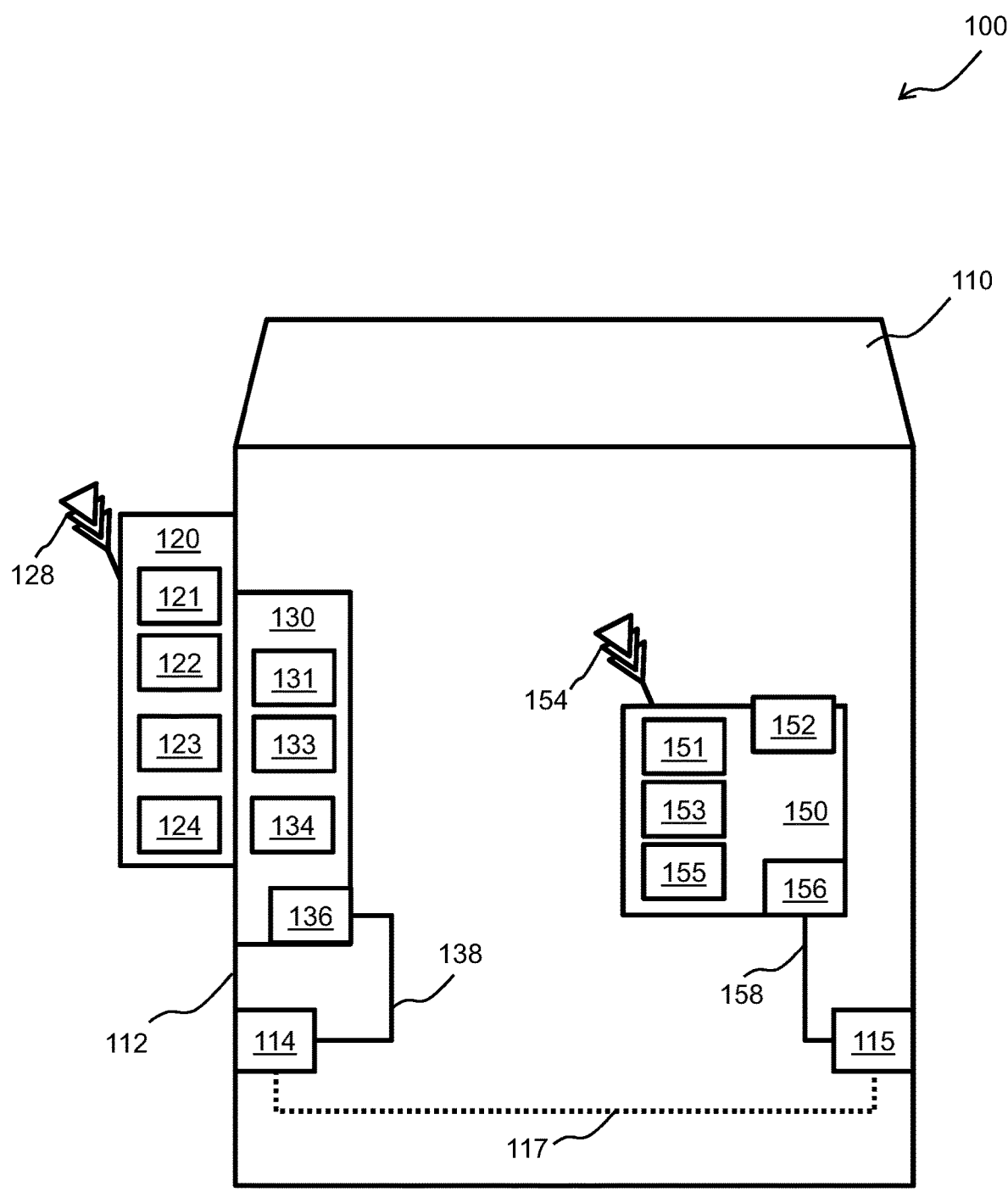
FIG. 1 depicts a system in accordance with one or more embodiments.

FIG. 1 provides a system 100 according to one or more embodiments. The system 100 illustrates an example topology distributed across a premises 111005. The premises 110 (a.k.a., a user premises, a home, or user premises segment) includes an exterior structure 112 (an external wall, a roof, or in close proximity to an external area of the premises 110), as well as power line sockets 114 and 115 and interior wiring 117. The system 100 includes an external modem unit 120 that includes one or more indicators 121, a satellite/ cellular modem 122, a short range transceiver 123, a wireless power receiver unit 124, and a transmit/receive (TX/RX) antenna 128.

The system 100 includes an internal unit 130 that one or more indicators 131, includes short range transceiver 133, a wireless power transmitter unit 134, a power line transceiver 136, and a power cable 138. The system 100 includes a router 150 (a.k.a., a router unit or a home router) that includes one or more indicators 151, one or more Ethernet sockets 152, an optional video decoder 153, a WiFi transceiver and antenna 154, an optional HDMI output 155, a power line transceiver 156, and power cable 158.

Generally, the external modem unit 120 and the internal unit 130 are on opposite sides of the exterior structure 112 of the premises 110. The external modem unit 120 at the wireless power receiver unit 124 receives inductive power from the wireless power transmitter unit 134 of the internal unit 130 through the exterior structure 112 of the premises 100. Further, the internal unit 103 at the wireless power transmitter unit 134 inductively provides power through the exterior structure 112 of the premises 110 to the wireless power receiver unit 124 of the external modem unit 120. Note that internal and the external modem units 130 and 120 each include the short range transceivers 136 and 126 to wireless communicating therebetween data.

According to one or more embodiments, the system 100 enables 'power over power lines', as well as aligning of magnetic coils (e.g., wireless power and shortrange data coils) within the external modem unit 120 and the internal unit 130 for wireless data and power transfer. As shown in FIG. 1, the external modem unit 120 mounted on the exterior structure 112 of the premises 110 includes the TX/RX antenna 128 that connects to satellites or cellular towers. The external modem unit 120 utilizes the satellite/cellular modem 122 decode and encode data transmitted and received through the TX/RX antenna 128 (i.e., to a specific radio frequency signal as required by the satellites or cellular towers). The TX/RX antenna 128 is directly connected to the external modem unit 120. The TX/RX antenna 128 can also be mounted outside of the premises 110 on an external wall, roof, or in close proximity to the external wall. The short range transceiver 123 enables transmission of data (e.g., from the satellite/cellular modem 122) through the exterior structure 112 to the short range transceiver 133 of the internal unit 130. The wireless power receiver unit 124 receives power through the exterior structure 112 and providing power to all other elements in the external modem unit 120.

The wireless power transmitter 134 of the internal unit 130 is matched with the wireless power receiver unit 124 of the external modem unit 120 and provides the external modem unit 120 with power. The wireless power transmitter 134 can be any device that can generate electromagnetic energy from, for example, an AC power source to a space around the wireless power transmitter 134 that is used to provide power to the wireless power receiver unit 124. The wireless power receiver unit 124 is any device that can receive, use, and/or store the electromagnetic energy when present in a space around the wireless power transmitter 134. Note that the wireless power receiver unit 124 can have a similar or the same component structure as the wireless power transmitter 134, and vice versa (e.g., both of the internal unit 130 and the external modem unit 120 can include similar electrical and provide similar functionality based on a particular operation of the system 100).

The short range transceiver 133 of the internal unit 130 is matched with the short range transceiver 123 of the external modem unit 120 and transfers data in and out of the premises 110 through the exterior structure 112. The power line transceiver 136 internally to the internal unit 130 connects to the short range transceiver 133 and transfers data over power lines (e.g., interior wiring 117). For instance, the internal unit 130 connects to the power line socket 114 using the power cable 138. The power cable 138 and corresponding connection is used both to feed power to the internal unit 130 as well as to transfer data, using the power line transceiver 136, to the router 150. According to one or more embodiments, the internal unit 130 can be placed such that a wireless power coil (which is part of the wireless power transmitter 134) is aligned with a wireless power coil of the wireless power transmitter 124 of the external modem unit 120. Further, similarly shortrange data coils (or antenna) of the short range transceivers 123 and 133 of the external modem and internal units 120 and 130 are aligned with each other from the both sides of the exterior structure 112.

The router 150 distributes a service through the premises 110 using, for example, LAN wireless or wired technologies such as WiFi LAN such as Ethernet. The router 150 includes the power line transceiver 156 that communicates with the power line transceiver 136 in the internal unit 130. The router 150 includes the WiFi transceiver and antenna 154 and one or more Ethernet socket 152 for distribution of an Internet connection' to devices that desire to leverage the system 100. The router 150 may also implement an HTTP server or webserver that enables a user to connect thereto and provide guidance on installation and configuration of the system 100. The router 150 connects to the power line socket 115 via the power cable 158. The router 150 may optionally include the video decoder 153 that decodes video streams and/or the HDMI output 154 or other connection options to connect to a display or storage device (as further described herein).

While example features and advantages are described with respect to the system 100, it is noted that the components, embodiments, and aspects of the system 100 can enable power of coax (PoC) and/or power over Ethernet (PoE) operations. According to one or more embodiments, the system 100 enables PoC and/or PoE so that components therein can bi-directionally communicate with data and drive power therebetween.

For example, PoC of the system 100 enables passing electric power and data on coaxial cabling between devices. With respect to the system 100, the power line transceivers 136 and 156 (i.e., in both the internal unit 130 and the router 150) can include coax data transceivers (e.g., using protocols, such as Multimedia over Coax Alliance standards). The power line transceiver 136 is connected to a same coax wire that is connected to the power line transceiver 156. Thus, a connection between the internal unit 120 and the router 150 can be performed over coax wire that provides power and data. In this case, the router 150 can remain connected to main power supply, so that the router 150 can provide PoC and data to the internal unit 130.

Similarly, PoE of the system 100 enables passing electric power along with data on twisted-pair Ethernet cabling so that a single cable provides both a data connection and electric power between devices. With respect to the system 100, the power line transceivers 136 (i.e., in the internal unit 130) can include Ethernet transceiver that can be connected to a single cable that is connected to the one of the Ethernet sockets 152. Thus, a connection between the internal unit 120 and the router 150 can be performed over single cable wire that provides power and data.

According to one or more embodiments, the external modem unit 120, the internal unit 130, and the router 150 can includes a controller. The controller, for brevity, is further described and shown with respect to the processor 402 of FIG. 2. Generally, the controller can control and/or communicate any part of the corresponding external modem unit 120, the internal unit 130, or the router 150 to provide modulation as needed for power transfer, as well as sensing circuits, circuitry, and/or software/firmware, for detecting/sensing voltage, current, or other features. In this regard, the controller can utilize a system memory, as described herein, to store and execute the software/firmware.

Figure 2:
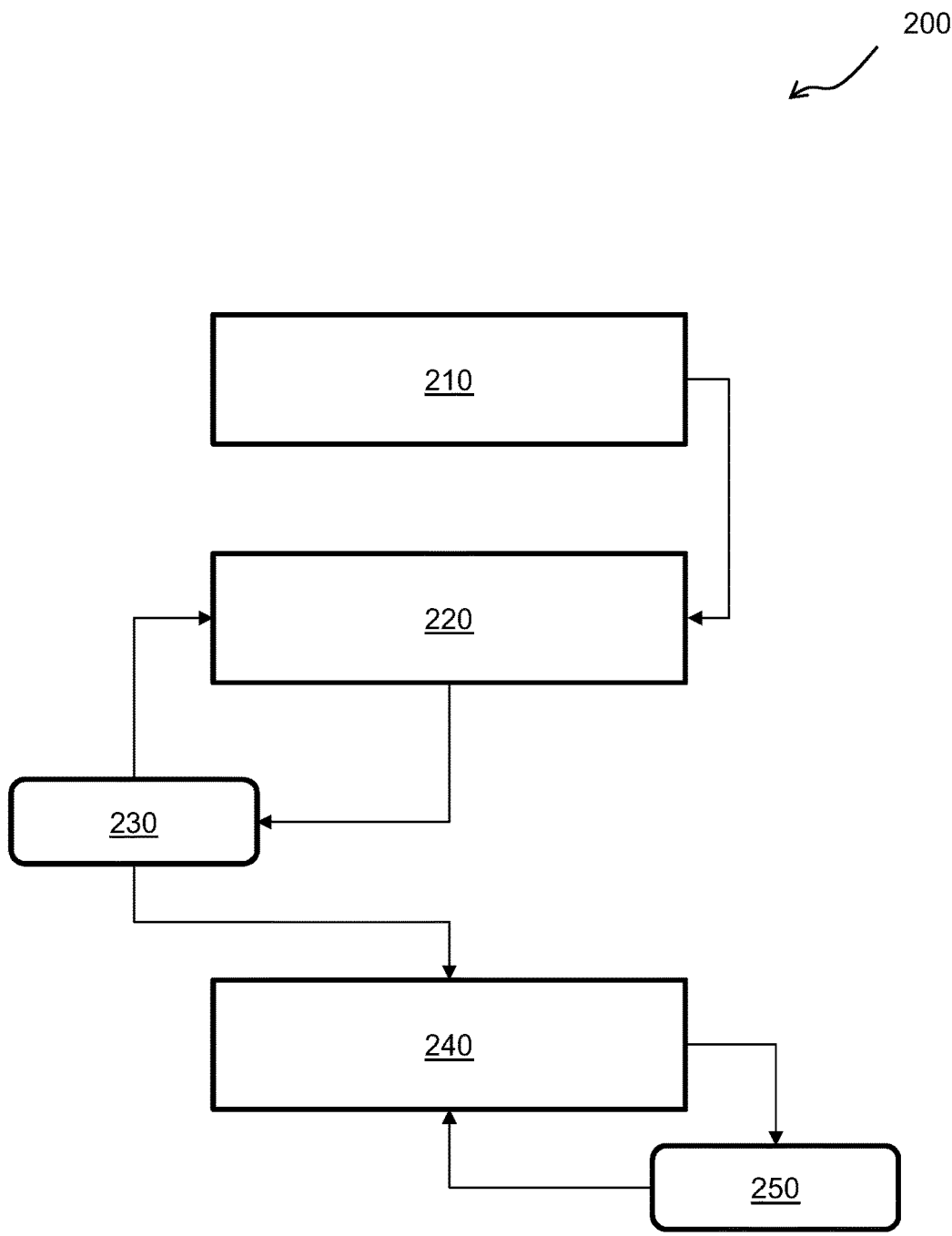
FIG. 2 depicts a method in accordance with one or more embodiments.

FIG. 2 depicts a method 200 in accordance with one or more embodiments. The method 200 can be embodied by the software/firmware and executed by one or more controllers of the external modem unit 120, the internal unit 130, and the router 150. Generally, the method 200 is an implementation of installation of the system 100. To aid in the installation of the system 100 in the premises 110, the external modem unit 120, the internal unit 130, and the router 150 can include visual and/or audible indications via the indicators 121, 131, and 151. The indicators 121, 131, and 151 can be in the form of LEDs and/or sounds to signal connections to power, valid local data connection, connections to a satellite or cellular tower, connections to the internet, and correct alignment.

The method 200, at block 210, begins when the internal unit 130 is plugged in or powered on. According to one or more embodiments, the internal unit 130 is plugged into the power line sockets 114 using the power cable 138 and the power line transceiver 136. In the case of, At block 220, the internal unit 130 is placed on an interior surface of the external structure 120. The aim is to place the internal unit 130 in line with an unobstructed (no foreign objects) transmission lane through the external structure 120. Upon placement, the internal unit 130 utilizes the short range transceiver 133 and/or the wireless power transmitter unit 134 to detect foreign objects, like metal, that would interfere with data/power transfers within the wall. In this regard, a controller of internal unit 130 can determine changes in a magnetic field as detected by the short range transceiver 133 and/or the wireless power transmitter unit 134.

According to one or more embodiments, the wireless power coil of the wireless power transmitter 134 and/or the short range data coil of the short range transceiver 133 can be mounted on steerable part of the internal unit 130 so that the unobstructed transmission lane can be found in view of a mounted position.

At decision block 230, the internal unit 130 provides feedback. The feedback can include power operations (i.e., displaying whether power is being provided to the internal unit 130), connection to the router 150 (i.e., the power line transceiver 136 is in connection with the power line transceiver 156), valid location of a wireless power coil of the wireless power transmitter 134, and valid location of a short range data coil of the short range transceiver 133. In some cases, the feedback can include a valid connection to the external modem unit 120. The feedback can be in the form of visual indications at the internal unit 130 by the one or more indicators 131. The feedback can also be in the form of signals communicated to the router 150, as the router 150 enables a user to connect thereto and provide guidance on installation and configuration of the internal unit 130. More particularly, a HTTP server or webserver on the router 150 can provide the indications and guidance to the required alignments, as well as to guide a user through the installation procedure of the method 200.

Based on the feedback of block 230, the internal unit 130 can be further moved (in which case the method 200 returns to block 220). That is, the method 200 can return to block 220 so that the wireless power coil and/or the short range data coil of the internal unit 130 can be moved to a position that eliminates interference. Alternatively, based on the feedback of block 230, the internal unit 130 can be fixed in place (in which case the method 200 continues to block 240).

At block 240, the external modem unit 120 is placed on an exterior surface of the external structure 120. The aim is to place the external modem unit 120 in line with the internal unit 130. Upon placement, the internal unit 130 utilizes the short range transceiver 133 and/or the wireless power transmitter unit 134 to provide power and data to the external modem unit 120 (e.g., the external modem unit 120 automatically receives power from the internal unit 130). Further, as power is supplied to the external modem unit 120, the external modem unit 120 itself also determines whether there is an alignment with the short range transceiver 133 and/or the wireless power transmitter unit 134. In this regard, a controller of the external modem unit 120 can determine changes in a magnetic field as detected by the short range transceiver 123 and/or the wireless power transmitter unit 124.

According to one or more embodiments, the wireless power coil of the wireless power transmitter 124 and/or the short range data coil of the short range transceiver 123 can be mounted on steerable part of the external modem unit 120 so that the unobstructed transmission lane can be found in view of a mounted position.

At decision block 250, the external modem unit 120 provides feedback. The feedback can include power operations (i.e., displaying whether power is being provided to the internal unit 130). The feedback can include a valid location indication when alignment is proper (e.g., a stable light and/or green light). The feedback can include a valid location indication that provides one or more warnings (e.g., a flashing light and/or red light) if an existing position of the wireless power coil or the short range data coil is in proximity to a foreign objects, like metal bars, metal rails, or other strong metal object, such as on the exterior structure 112.

Based on the feedback of block 250, the external modem unit 120 can be further moved (in which case the method 200 returns to block 240). That is, the method 200 can return to block 220 so that the wireless power coil and/or the short range data coil of the external modem unit 120 can be moved to a position that provides for proper alignment and eliminates interference and.

According to one or more embodiments, once the external modem unit 120 is placed within range of the internal unit 130, the external modem unit 120 will receive power wirelessly through the exterior structure 112 from the internal unit 130; thereby causing a power indicator (i.e., an indicator 121) to light. If the alignment is not optimal, the power indicator (i.e., the indicator 121) will provide feedback (e.g., a flashing and/or orange light). Once the user moves the external modem unit 120 in optimal alignment the power indicator (i.e., the indicator 121) will indicate the same (e.g., a stable and/or green light).

According to one or more embodiments, the short range data coil of the external modem unit 120 can be collocated or in fixed location vs. the power (i.e., both of the coil and antenna are placed on the steerable part of the interior unit), so proper alignment of the wireless power coil coils guarantees proper alignment of the short range data coil and can also assure avoidance of foreign objects interference between the short range data coils on the two sides of the exterior structure 112.

According to one or more embodiments, the relative placement of the two type of short range data coils can include placement of the short range data coils inside and specifically in a center or middle of the wireless power coils, or in fixed offset outside of the wireless power coils. The same placement being used for both the interior and exterior short range data coils couples, so alignment of the wireless power coils guarantees alignment of the short range data coils. If alignment of the TX/RX) antenna 128 is also required, this alignment can be performed using additional indications on the external modem unit 120.

Alternatively, based on the feedback of block 250, the internal unit 130 can be fixed in place (in which case the method 200 concludes).

Figure 3:
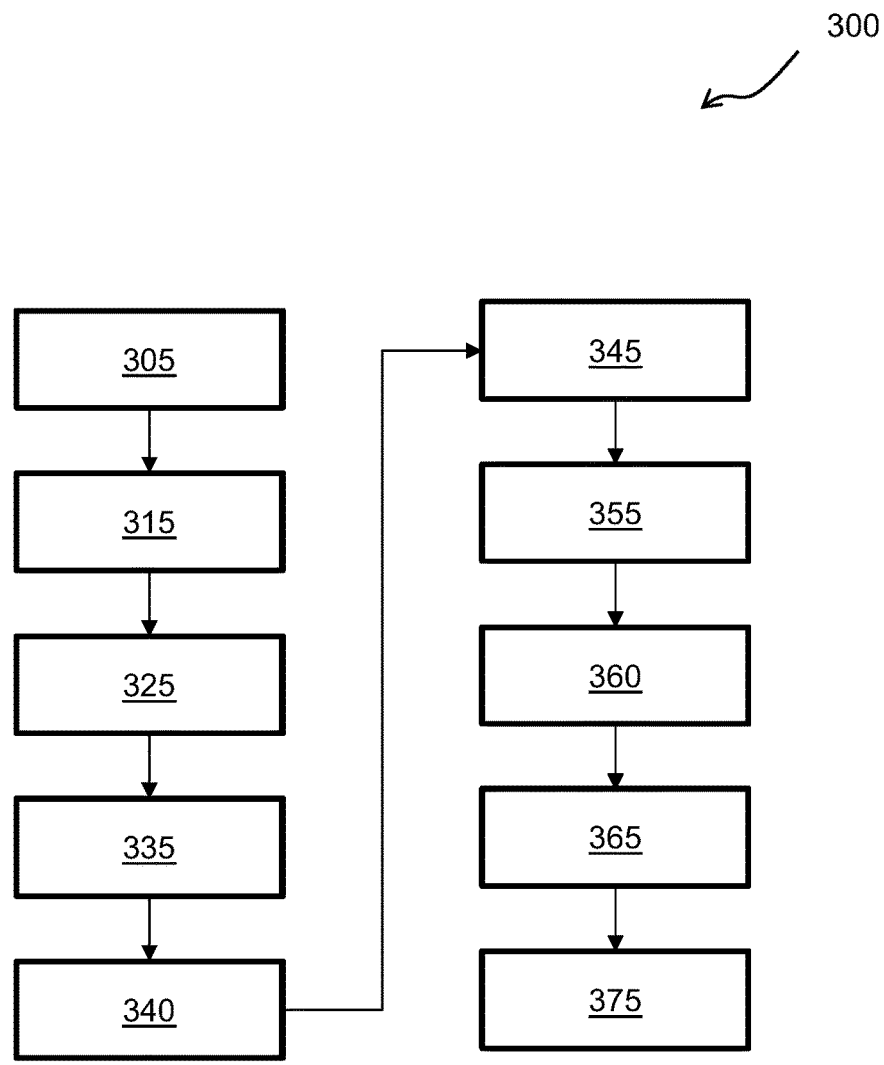
FIG. 3 depicts a method in accordance with one or more embodiments.

FIG. 3 depicts a method 300 in accordance with one or more embodiments. The method 300 can be embodied by the software/firmware and executed by one or more controllers of the external modem unit 120, the internal unit 130, and the router 150. Generally, the method 300 is an implementation of installation of the system 100. To aid in the installation of the system 100 in the premises 110, the external modem unit 120, the internal unit 130, and the router 150 can include visual and/or audible indications via the indicators 121, 131, and 151. The indicators 121, 131, and 151 can be in the form of LEDs and/or sounds to signal connections to power, valid local data connection, connections to a satellite or cellular tower, connections to the internet, and correct alignment.

The method 300 begins when, at block 305, the router 150 is connected to power. By way of example, the router 150 connects to the power line socket 115 via the power cable 158. A user, in some cases, can plug the power cable 158 into the power line socket 115 and the power line transceiver 156. The indicator 151 of the router 150 turns on to indicate/validate power is being provided.

Then, at block 315, a user device (e.g., a mobile handset, personal computer, or the like) is connected to the router 150. The user device can connect via a WiFi transceiver and antenna 154 or through the one or more Ethernet sockets 152. Once connected, the HTTP server or webserver of the router 150 can be used to aid the installation of the system 100.

At block 325, the power line socket 114 on an inside of the exterior structure 112 can be identified by the user. At block 335, the internal unit 130 is connected to power. By way of example, the internal unit 130 is connected to the to the power line socket 114 via the power cable 138. A user, in some cases, can plug the power cable 158 into the power line socket 115 and the power line transceiver 156. Also, once connected, the HTTP server or webserver of the router 150 can be receive signals from the internal unit 130 and provide information to the user device to aid the installation of the system 100.

At block 340, a power indication and a connection indication to the router 150 is validated. That is, the indicator 131 of the internal unit 131 turns on to indicate/validate power is being provided. At block 345, if the power indication is flashing, the internal unit 130 and/or the coils therein are moved until the power indication goes stable. If no position is found that shows a stable indication, the internal unit 130 is relocated to another power line socket 114 on an inside of the exterior structure 112. Also, once connected, the HTTP server or webserver of the router 150 can be provide information with respect to moving the internal unit 130 and/or the coils the user device to aid the installation of the system 100. Further, once the power and connection indications are valid, the internal unit 130 can be either placed on a flat surface or mounted to the exterior structure 112 (as shown in FIG. 1). In some cases, the internal unit 130 can include a connect button to manually indicate that placement is complete.

At block 355, an exterior portion of the exterior structure 112 that is assumed to be adjacent to the internal unit 130 can be identified by the user. At block 360, the external modem unit 120 (and therefore the wireless power coil) is placed on the exterior portion of the exterior structure 112. At block 365, a power indication to the internal unit 130 is validated (wait for the power indication to go on). That is, the indicator 121 of the external modem unit 120 turns on to indicate/validate power is being provided by the internal unit 130 through the exterior structure 112. If no power indication turns on, the external modem unit 120 is repositioned until the power indication turns on.

According to one or more embodiments, if the indicator 121 is flashing red, the external modem unit 120 and/or the coils therein are directed to be moved up then down and then back up until the indication turns orange. The external modem unit 120 and/or the coils therein are further directed to be moved left then right and then back left until indication goes flashing green. Movement tolerance, as instructed by the HTTP server or webserver, in each direction can be approximately 127 millimeters (e.g., 5 inches) and should performed at a pace of approximately 25.4 millimeters per second (e.g., 1 inch per second). The flashing green light can shut off after 5 seconds to indicate that the external modem unit 120 should be mounted.

At block 375, the external modem unit 120 is mounted to the identified/designated location on the exterior portion of the exterior structure 112. In some cases, the external modem unit 120 can include a connect button to manually indicate that mounting is complete. At the conclusion of the installation, all devices of the system 100 can provide one or more valid lights indicating stable power and connections via the indicators 121, 131, and 151.

Figure 4:
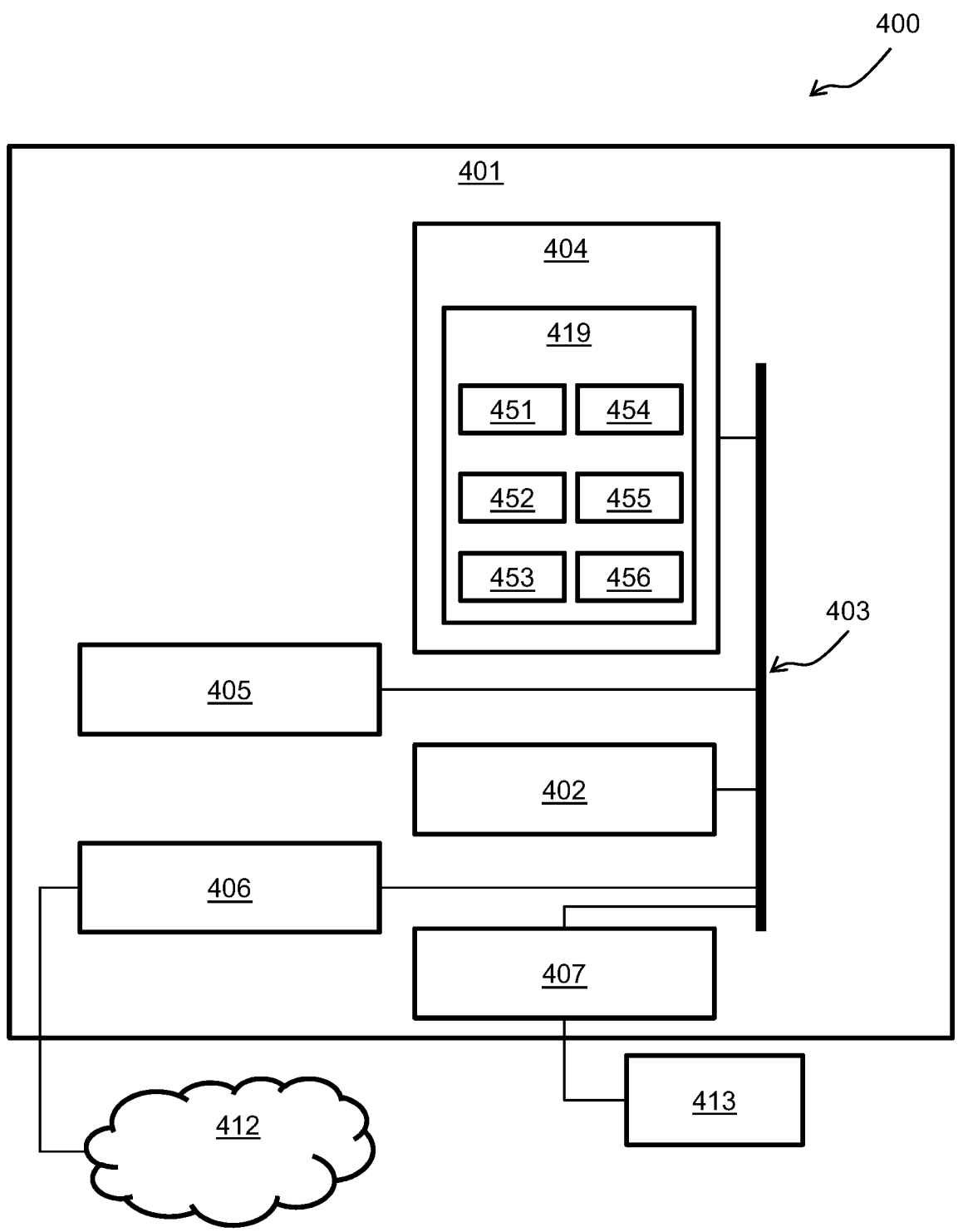
FIG. 4 depicts a system in accordance with one or more embodiments.

FIG. 4 depicts a system 400 in accordance with one or more embodiments. The system 400 has a device 401 (e.g., the external modem unit 120, the internal unit 130, and/or the router 150 of the system 100 of FIG. 1) with one or more central processing units (CPU(s)), which are collectively or generically referred to as processor(s) 402 (e.g., the controllers of the external modem unit 120, the internal unit 130, and the router 150). The processors 402, also referred to as processing circuits, are coupled via a system bus 403 to system memory 404 and various other components. The system memory 404 can include a read only memory (ROM), a random access memory (RAM), internal or external Flash memory, embedded static-RAM (SRAM), and/or any other volatile or non-volatile memory. For example, the ROM is coupled to the system bus and may include a basic input/output system (BIOS), which controls certain basic functions of the device 401, and the RAM is read-write memory coupled to the system bus 403 for use by the processors 402.

FIG. 4 further depicts an I/O adapter 405, a communications adapter 406, and an adapter 407 coupled to the system bus 403. The I/O adapter 405 may be a small computer system interface (SCSI) adapter that communicates with a drive and/or any other similar component. The communications adapter 406 interconnects the system bus 403 with a network 412, which may be an outside network (power or otherwise), enabling the device 401 to communicate data and/or transfer power with other such devices (e.g., the router 150 connecting a user device and communicate alignment indications). Additional input/output devices can be connected to the system bus 403 via the adapter 407, such as a mouse, a touch screen, a keypad, a camera, a speaker, etc. For example, a display (e.g., screen, a display monitor) is connected to the system bus 403 by the adapter 407, which may include a graphics controller to improve the performance of graphics intensive applications and a video controller.

In one embodiment, the adapters 405, 406, and 407 may be connected to one or more I/O buses that are connected to the system bus 403 via an intermediate bus bridge. Suitable I/O buses for connecting peripheral devices such as hard disk controllers, network adapters, and graphics adapters typically include common protocols, such as the Peripheral Component Interconnect (PCI).

The system memory 404 is an example of a computer readable storage medium, where software 419 can be stored as instructions for execution by the processor 402 to cause the device 401 to operate, such as is described herein with reference to FIGS. 1-3. In connection with FIG. 1, the software 419 can be representative of firmware of devices of the system 100, such that the memory 404 and the processor 402 logically provide one or more of feedback operations 451, power detection operations 452, data communication operations 453, foreign object detection operations 454, alignment operations 455, and indicator operations 456.

According to one or more embodiments, a user premises system is provided. The user premises system includes an internal unit and an external modem unit. The internal unit includes a wireless power transmitter unit that inductively provides power through an exterior structure of a premises. The external modem unit includes a wireless power receiver unit that inductively receives power from the wireless power transmitter unit of the internal unit through the exterior structure of the premises. The internal and the external modem units each include a short range transceiver that wireless communicate data between internal and the external modem units.

According to one or more embodiments or any of the user premises system embodiments herein, the internal unit can receive power over power lines at a power line transceiver through a power cable connected to a power line socket to provide the inductive power to the external modem unit.

According to one or more embodiments or any of the user premises system embodiments herein, the internal unit can receive power of coax at a power line transceiver to a router to provide the inductive power to the external modem unit.

According to one or more embodiments or any of the user premises system embodiments herein, the internal unit can receive power over Ethernet at a power line transceiver to a router to provide the inductive power to the external modem unit.

According to one or more embodiments or any of the user premises system embodiments herein, a short range data coil of the short range transceiver of the internal unit can be within a center of a wireless power coil of the wireless power transmitter unit.

According to one or more embodiments or any of the user premises system embodiments herein, the external modem unit can include one or more indicators to indicate alignment of the external modem unit with the internal unit during installation.

According to one or more embodiments or any of the user premises system embodiments herein, the internal unit can include one or more indicators to indicate unobstructed transmission lane through the external structure during installation.

According to one or more embodiments or any of the user premises system embodiments herein, the external modem unit can include a transmit/receive antenna connected to a modem that is configured to decode and encode data transmitted and received through the transmit/receive antenna.

According to one or more embodiments or any of the user premises system embodiments herein, the user premises system can include a router that is communicatively coupled to the internal unit and configured to provide aid to an installation process of the user premises system.

According to one or more embodiments or any of the user premises system embodiments herein, the external modem unit can automatically receive power from the internal unit during installation.

According to one or more embodiments, any of the user premises system embodiments can be implemented as a method, an apparatus, system, and/or a computer program product.

According to one or more embodiments, a method is provided. The method is implemented by a user premises system comprising an internal unit and an external modem unit position on opposite sides of an exterior structure of a premises. The method includes detecting, by the internal unit, foreign objects that would interfere with data and power transfers within the exterior structure of the premises. The method includes inductively providing power, by a wireless power transmitter unit of the internal until, through the exterior structure of the premises to the internal unit comprising. The method includes inductively receiving power, by a wireless power receiver unit of the external modem unit, from the wireless power transmitter unit of the internal unit.

According to one or more embodiments or any of the method embodiments herein, a controller of the internal unit can determine changes in a magnetic field as detected by a short range transceiver of the internal unit or the wireless power transmitter unit of the internal unit to detect one or more foreign objects.

According to one or more embodiments or any of the method embodiments herein, the internal and the external modem units can each include a short range transceiver that wireless communicate data between internal and the external modem units.

According to one or more embodiments or any of the method embodiments herein, the user premises system can include a router that is communicatively coupled to the internal unit and configured to provide aid to an installation process of the user premises system.

According to one or more embodiments or any of the method embodiments herein, the internal and the external modem units can each provide feedback with respect to transmitting and receiving inductive power.

According to one or more embodiments or any of the method embodiments herein, a short range data coil of the short range transceiver of the internal unit can be within a center of a wireless power coil of the wireless power transmitter unit.

According to one or more embodiments or any of the method embodiments herein, the external modem unit can include one or more indicators to indicate alignment of the external modem unit with the internal unit during installation.

According to one or more embodiments or any of the method embodiments herein, the internal unit can include one or more indicators to indicate unobstructed transmission lane through the external structure during installation.

According to one or more embodiments or any of the method embodiments herein, the external modem unit can include a transmit/receive antenna connected to a modem that is configured to decode and encode data transmitted and received through the transmit/receive antenna.

According to one or more embodiments or any of the method embodiments herein, the external modem unit can automatically receive power from the internal unit during installation.

According to one or more embodiments, the above method can be implemented as a user premises system, an apparatus, system, and/or a computer program product.

As indicated herein, embodiments disclosed herein may include apparatuses, systems, methods, and/or computer program products at any possible technical detail level of integration. The computer program product may include a computer readable storage medium (or media) having computer readable program instructions thereon for causing a controller to carry out aspects of the present invention.

The computer readable storage medium can be a tangible device that can retain and store computer readable program instructions. The computer readable storage medium may be, for example, but is not limited to, an electronic storage device, a magnetic storage device, an optical storage device, an electromagnetic storage device, a semiconductor storage device, or any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

The computer readable program instructions described herein can be communicated and/or downloaded to respective controllers from an apparatus, device, computer, or external storage via a connection, for example, in-band communication. Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

The flowchart and block diagrams in the drawings illustrate the architecture, functionality, and operation of possible implementations of apparatuses, systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the flowchart and block diagrams in the drawings. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used herein, specify the presence of stated features, integers, steps, operations, elements, and/or components, but do not preclude the presence or addition of one more other features, integers, steps, operations, element components, and/or groups thereof.

The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A user premises system comprising:
an internal unit comprising a wireless power transmitter unit configured to inductively provide power through an exterior structure of a premises; and
an external modem unit comprising a wireless power receiver unit configured to inductively receive power from the wireless power transmitter unit of the internal unit through the exterior structure of the premises,
wherein the internal and the external modem units each comprise a short range transceiver that wireless communicate data between internal and the external modem units,
wherein the internal unit receives power of coax at a power line transceiver to a router to provide the inductive power to the external modem unit.

2. The user premises system of claim 1, wherein the internal unit receives power over power lines at a power line transceiver through a power cable connected to a power line socket to provide the inductive power to the external modem unit.

3. A user premises system comprising:
an internal unit comprising a wireless power transmitter unit configured to inductively provide power through an exterior structure of a premises; and
an external modem unit comprising a wireless power receiver unit configured to inductively receive power from the wireless power transmitter unit of the internal unit through the exterior structure of the premises,
wherein the internal and the external modem units each comprise a short range transceiver that wireless communicate data between internal and the external modem units, wherein the internal unit receives power over Ethernet at a power line transceiver to a router to provide the inductive power to the external modem unit.

4. A user premises system comprising:
an internal unit comprising a wireless power transmitter unit configured to inductively provide power through an exterior structure of a premises; and
an external modem unit comprising a wireless power receiver unit configured to inductively receive power from the wireless power transmitter unit of the internal unit through the exterior structure of the premises,
wherein the internal and the external modem units each comprise a short range transceiver that wireless communicate data between internal and the external modem units, wherein a short range data coil of the short range transceiver of the internal unit is within a center of a wireless power coil of the wireless power transmitter unit.

5. The user premises system of claim 1, wherein the external modem unit comprises one or more indicators to indicate alignment of the external modem unit with the internal unit during installation.

6. A user premises system comprising:
an internal unit comprising a wireless power transmitter unit configured to inductively provide power through an exterior structure of a premises; and
an external modem unit comprising a wireless power receiver unit configured to inductively receive power from the wireless power transmitter unit of the internal unit through the exterior structure of the premises,
wherein the internal and the external modem units each comprise a short range transceiver that wireless communicate data between internal and the external modem units, wherein the internal unit comprises one or more indicators to indicate unobstructed transmission lane through the external structure during installation.

7. The user premises system of claim 1, wherein the external modem unit comprises a transmit/receive antenna connected to a modem that is configured to decode and encode data transmitted and received through the transmit/receive antenna.

8. The user premises system of claim 1, wherein the user premises system comprises a router that is communicatively coupled to the internal unit and configured to provide aid to an installation process of the user premises system.

9. The user premises system of claim 1, wherein the external modem unit is configured to automatically receive power from the internal unit during installation.

10. A method implemented by a user premises system comprising an internal unit and an external modem unit position on opposite sides of an exterior structure of a premises, the method comprising:
detecting, by the internal unit, foreign objects that would interfere with data and power transfers within the exterior structure of the premises;
inductively providing power, by a wireless power transmitter unit of the internal until, through the exterior structure of the premises to the internal unit comprising; and
inductively receiving power, by a wireless power receiver unit of the external modem unit, from the wireless power transmitter unit of the internal unit.

11. The method of claim 10, wherein a controller of the internal unit determine changes in a magnetic field as detected by a short range transceiver of the internal unit or the wireless power transmitter unit of the internal unit to detect one or more foreign objects.

12. The method of claim 10, wherein the internal and the external modem units each comprise a short range transceiver that wireless communicate data between internal and the external modem units.

13. The method of claim 10, wherein the user premises system comprises a router that is communicatively coupled to the internal unit and configured to provide aid to an installation process of the user premises system.

14. The method of claim 10, wherein the internal and the external modem units each provide feedback with respect to transmitting and receiving inductive power.

15. The method of claim 10, wherein a short range data coil of the short range transceiver of the internal unit is within a center of a wireless power coil of the wireless power transmitter unit.

16. The method of claim 10, wherein the external modem unit comprises one or more indicators to indicate alignment of the external modem unit with the internal unit during installation.

17. The method of claim 10, wherein the internal unit comprises one or more indicators to indicate unobstructed transmission lane through the external structure during installation.

18. The method of claim 10, wherein the external modem unit comprises a transmit/receive antenna connected to a modem that is configured to decode and encode data transmitted and received through the transmit/receive antenna.

19. The method of claim 10, wherein the external modem unit is configured to automatically receive power from the internal unit during installation.

* * * * *